United States Patent [19]

Ehmig

[11] 4,088,301

[45] May 9, 1978

[54] VALVE ARRANGEMENT FOR A VACUUM LINE

[75] Inventor: Gerhard Ehmig, Feldkirch-Tosters, Austria

[73] Assignee: VAT Aktiengesellschaft fur Vakuum-Apparate-Technik, Haag, Switzerland

[21] Appl. No.: 741,059

[22] Filed: Nov. 11, 1976

[30] Foreign Application Priority Data

Nov. 15, 1975 Germany .............................. 2551429

[51] Int. Cl.² ............................................... F16K 1/00
[52] U.S. Cl. ...................................... 251/334; 251/189
[58] Field of Search ................................. 251/334, 189

[56] References Cited

U.S. PATENT DOCUMENTS

| 1,721,324 | 7/1929 | Wilson | 251/334 X |
| 3,108,780 | 10/1963 | Wishart | 251/189 X |
| 3,327,993 | 6/1967 | Elckyshyn | 251/334 |

Primary Examiner—Harold W. Weakley

[57] ABSTRACT

In a valve arrangement in which a metallic valve body has an edge portion elongated in a closed loop and can be moved into a position of sealing engagement over the entire length of the loop with a cooperating seating surface in a vacuum line, and the engaged edge portion is pressed against the seating surface with a pressure sufficient to form a vacuum tight seal, the invention provides a hollow valve body whose cavity is sealed by a first wall portion. A peripheral part of the wall portion envelops a central part and is joined to at least one other wall portion along the closed loop of the edge portion. The first wall portion slopes inward of the cavity from each longitudinal section of the loop toward the central part. When a gas under sufficient pressure moves the central part of the first wall portion outward of the cavity, the peripheral part and the joined edge portion expand, and the edge portion is pressed against the seating surface.

11 Claims, 10 Drawing Figures

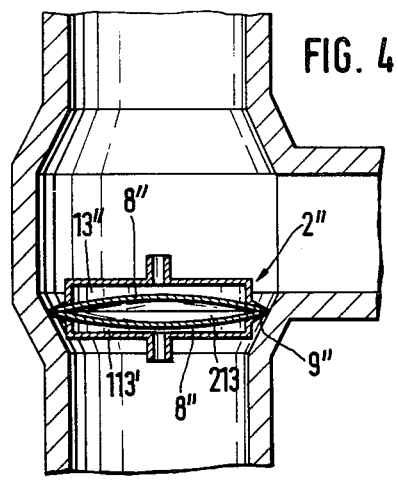
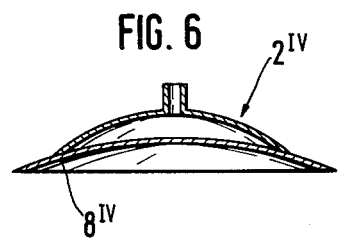
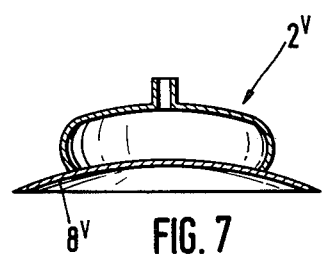
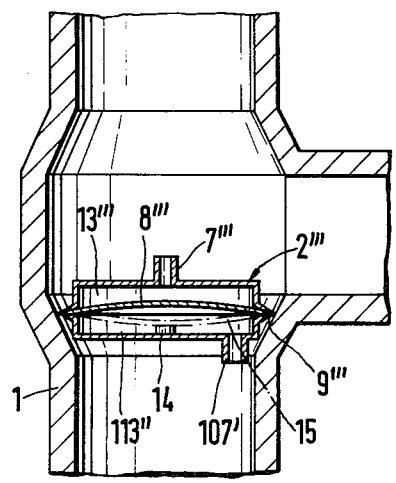
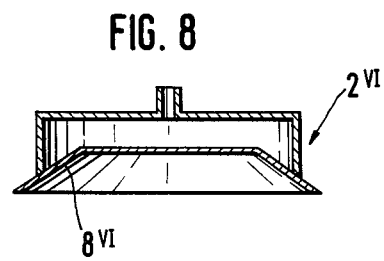

VALVE ARRANGEMENT FOR A VACUUM LINE

This invention relates to high-vacuum technology, and particularly to a valve arrangement for sealing a vacuum line communicating with a vacuum system.

In its more specific aspects, this invention is concerned with an improvement in the high-vacuum valve disclosed in Thebado U.S. Pat. No. 3,554,486. In the known valve, a movable closure member having the shape of a spherical segment of sheet metal radially engages a knife edge on the wall of a vacuum line when the edge portion of the closure member is radially expanded by axial compression.

The axially applied pressure causes relative axial movement of the closure member and the engaged knife edge before an ultimate sealing position is reached. The resulting wear of the engaged metal surfaces limits the useful life of the known valve because even minor irregularities of the engaged surfaces impair the seal. The necessary high, axial pressure must be absorbed by the valve housing so that the known valve is relatively bulky and heavy.

It is the primary object of this invention to improve the known valve in such a manner that it can be sealed without applying significant axial forces to the closure member, without causing inherent relative movement of the sealing elements in an axial direction, and without transmitting axial stresses of significant magnitude to the valve housing.

With this object and others in view, the closure member in the valve arrangement of the invention is a hollow valve body. A plurality of wall portions of the valve body jointly seal a cavity in the same. A first one of these wall portions has a peripheral part and a central part enveloped by the peripheral part. The peripheral part is joined to at least one other wall portion along a closed loop in which an external edge portion of the valve body is elongated. After the valve body is moved into a position of engagement of its edge portion with seating means on the vacuum line, gas is supplied to the valve body cavity. The afore-mentioned first wall portion slopes inward of the cavity in the valve body from each longitudinal section of the loop toward the central part of the same wall portion. When the pressure of the supplied gas reaches a sufficient magnitude, the central part of the first wall portion is moved outward of the cavity, whereby the peripheral part and the edge portion joined thereto are expanded for making the engagement of the edge portion with the seating means vacuum-tight.

Other features, additional objects, and many of the attendant advantages of this invention will readily be appreciated as the same becomes better understood from the following detailed description of preferred embodiments when considered in connection with the appended drawing in which:

FIGS. 3 to 5 show further valve arrangements of the invention in views corresponding to that of FIG. 1;

FIGS. 6 to 8 illustrate valve bodies suitable for use in the valve arrangement of FIG. 1;

Figure 1:
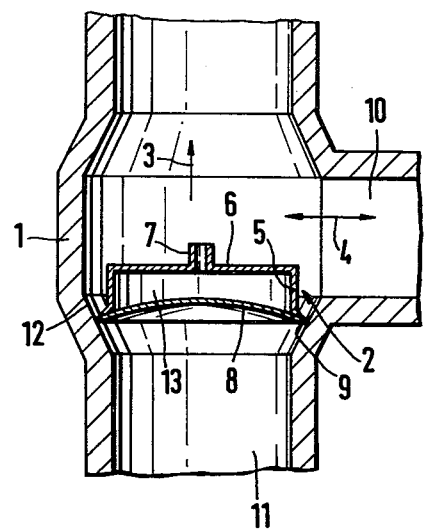
FIG. 1 shows a valve arrangement of the invention in a first stage of its closing operation, the view being in simplified elevational section on the axis of the vacuum line to be sealed.

Referring now to the drawing in detail, and initially to FIG. 1, there is shown a sealing portion 1 of a straight vacuum line 11 of circular cross section and a valve body 2 coaxially positioned in the line portion 1. The valve body 2 may be moved axially in the line portion 1 as indicated by an arrow 3, and transversely into and out of a chamber 10 as indicated by an arrow 4 to clear the flow path in the line 11. One type of the necessary moving mechanism is known from the afore-mentioned patent, and another type will be described in more detail with reference to FIGS. 9 and 10.

The valve body 2 is a hollow box of thin sheet metal such as Inconel or other corrosion resistant alloy. It has a circular top wall 6 whose periphery is welded to or integral with a cylindrical wall 5 having a diameter several times greater than its axial height. A nipple 7 communicating with the cavity 13 of the valve body 2 projects axially from the central part of the top wall 6.

The bottom wall 8 bounding the cavity 13 is a segment of a hollow sphere whose peripheral part is joined by a weld to the circular bottom edge of the wall 5 and projects radially outward beyond the wall 5 to form an edge portion 9 of the valve body which is elongated in a closed, circular loop about the axis of the valve body 2. The bottom wall 8 slopes uniformly inwardly of the cavity 13 in the valve body from the entire length of the edge portion 9 so that the central part of the wall 8 is axially offset from the radial plane of the edge portion 9.

In the position illustrated in FIG. 1, the edge portion 9 is seated on a conical inner wall 12 of the line portion 1. While shown in FIG. 1 and in other, similar views of the drawing to have an apex angle of about 60°, the wall 12 is inclined relative to the line axis at an angle of not more than about 3°, the larger angle of deviation from a precisely cylindrical shape being shown for the convenience of pictorial representation only. The edge portion 9 rests on the conical wall 12 only under the insignificant weight of the valve body 2, and the contact pressure between the edge portion 9 and the wall 12 is insufficient to provide a seal capable of maintaining a high vacuum in a sealed vacuum system.

Figure 2:
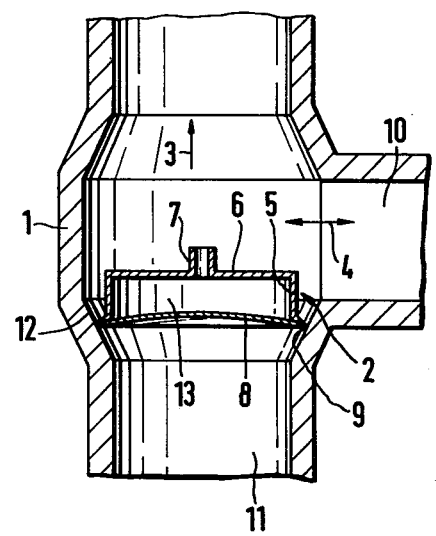
FIG. 2 shows the valve arrangement of FIG. 1 in its final, sealed condition.
Figure 10:
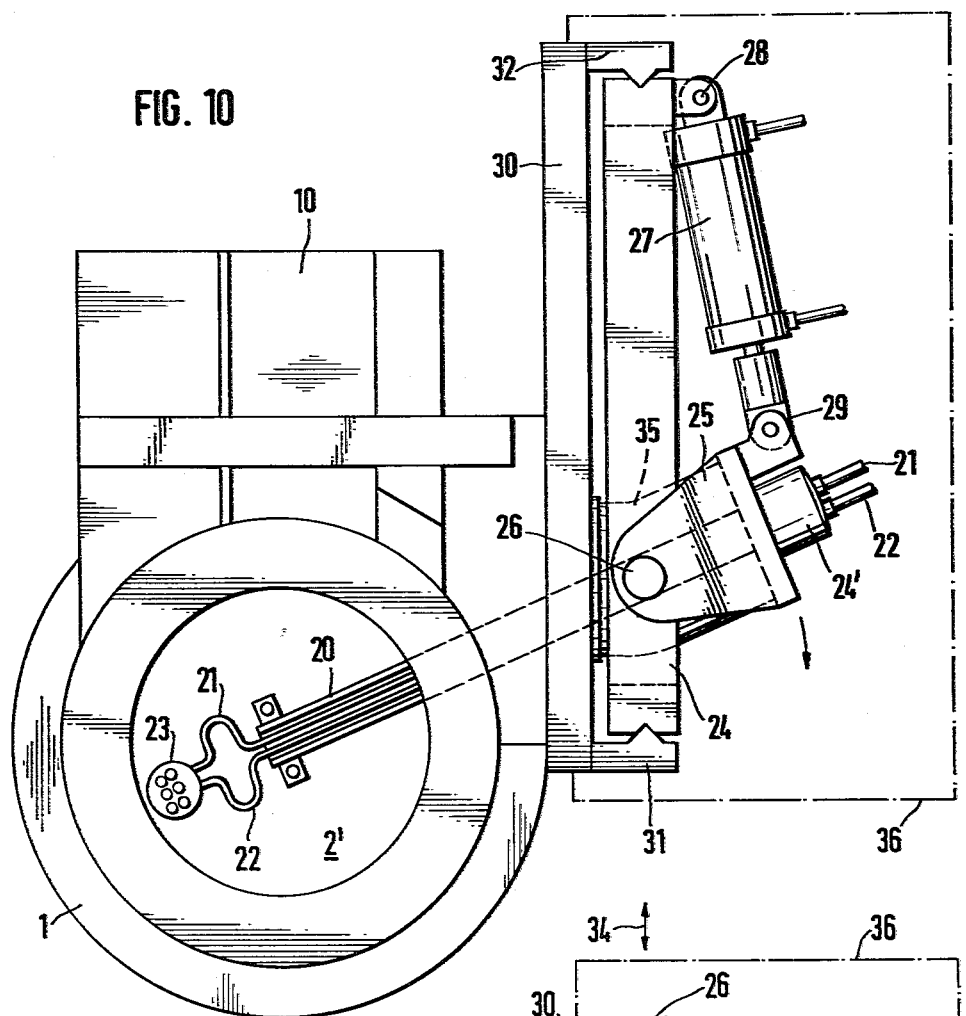
FIG. 10 illustrates the device of FIG. 9 in top plan view.
Figure 9:
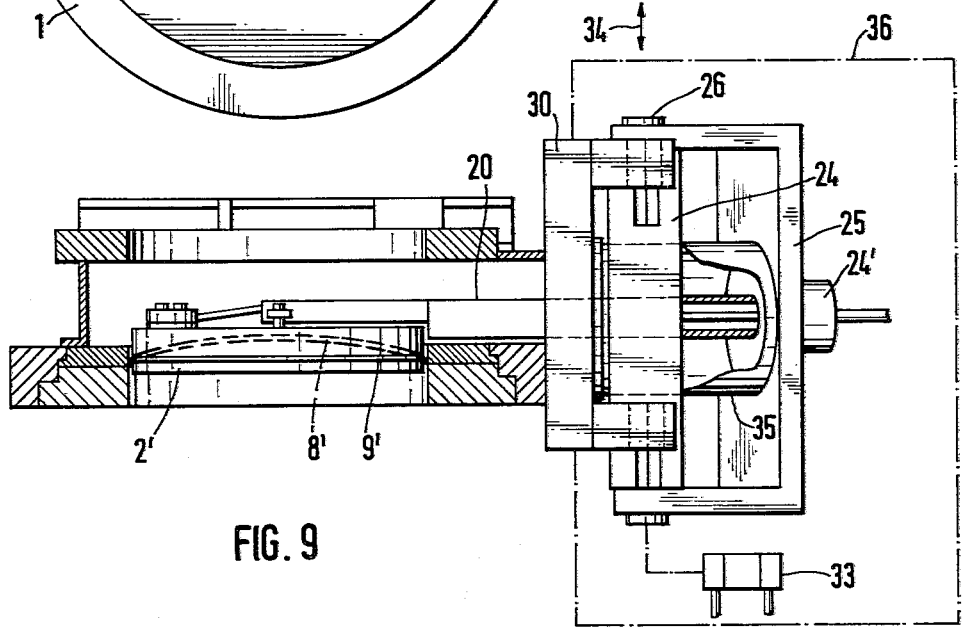
FIG. 9 shows an actual embodiment of the valve arrangement of FIG. 3 in a fragmentary view analogous to that of FIG. 3.

The nipple 7 is connected by a hose, not shown in FIGS. 1 and 2, to a line carrying compressed nitrogen outside the vacuum system, as is illustrated more fully in FIGS. 9 and 10. When a pressure of the order of 30 p.s.i.g. is built up in the cavity 13, the central part of the bottom wall 8 is moved axially outward of the cavity 13, causing an expansion of the edge portion 9 and of the adjacent part of the initially cylindrical wall 5. The expanding edge portion firmly engages the wall 12, and the line portion 1 is sealed. The very minor axial component of the contact pressure between the edge portion 9 and the wall 12 cannot overcome the friction between the engaged metal surfaces. There is no axial movement of the valve body 2 to a wider axial portion of the line 11. The radial component of the contact pressure may be of the order of 400 kg per cm of edge portion circumference, and is sufficient to maintain a seal preventing leakage of more than $10^{-9}$ torr-liter per second, as determined by means of helium.

The conical shape of the wall 12 is convenient in limiting the downward movement of the valve body 2. However, a precisely cylindrical wall of the vacuum line 11 is as effectively engaged by the expanding edge portion 9. The precise axial location of the valve body in the preliminary closing position of FIG. 1 is unimportant, and the edge portion 19 may engage any portion of the wall 12 since the axial length of the wall 12 is much greater than the corresponding dimension of the edge portion 9. In all practical sealing positions of the valve body 2, the wall 12 projects in both axial directions beyond the edge portion 9.

The radius of curvature of the bottom wall 8 does not actually increase as much under the internal pressure in the valve body 2 as has been shown in FIG. 2 for the sake of clarity. The engaging metal faces of the wall 12 and of the edge portion 9 are ground and polished to precise circular cross sections. The maximum clearance along the circumference of the edge portion 9 in the absence of gas pressure in the cavity 13 is of the order of a very small fraction of a millimeter for a line diameter of a decimeter or more. The expansion of the edge portion 9 necessary for making the seal vacuum-tight thus is minimal and well within the elastic limit of the metal. The edge portion 9 is deformed under the radial pressure to match precisely the configuration of the seating surface on the wall 12, but the original shape of the edge portion is restored elastically when the cavity 13 is vented or evacuated. The valve body 2 may then be lifted and shifted into the chamber 10 by minimal applied forces.

In the valve body 2, the concave outer face of the bottom wall 8 is exposed in the vacuum line 11, and its function may be impaired if the sealed portion of the line 11 below the valve body 2 is opened to the atmosphere or connected to a source of superatmospheric pressure. The modified embodiment of the invention shown in FIG. 3 avoids this problem.

Figure 3:
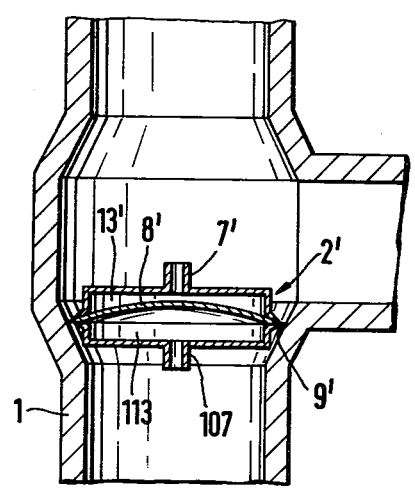

The sealing portion 1 of a vacuum line seen in FIG. 3 is identical with the corresponding element in FIG. 1. The cylindrical valve body 2' encloses a cavity 13' similar to the cavity 13 described above and sealed by a spherical bottom wall 8' whose edge portion 9' projects outward for sealing engagement with the inner wall of the line portion 1 when the cavity 13' is charged with the compressed gas through a nipple 7'.

The cup-shaped part of the valve body 2' which is joined to the convex face of the wall 8' is duplicated on the opposite axial side of the wall 8' so that the concave face of the wall bounds a chamber 113 otherwise identical with the cavity 13' and provided with a nipple 107. The sealing effect of the compressed gas in the cavity 13' may thus be supplemented by connecting the nipple 107 with a vacuum pump, and release of the valve body 2' from the line portion 1 may be facilitated by reversing the connections of the nipples 7', 107.

The valve arrangement shown in FIG. 4 is provided with a valve body 2" differing from the valve body 2' by two spherically arcuate walls 8" transverse to the valve axis. The walls 8" are joined peripherally in a common, projecting edge portion 9" and diverge axially from their peripheral parts toward the central parts. The concave face of one wall 8" seals a cavity 13" with other walls of the valve body substantially as described with reference to FIG. 1. The convex face of the same wall 8" bounds a chamber which is divided into two compartments 113' and 213 by the other wall 8". Nipples give access to the cavity 13" and the compartment 113'. A flexible metal hose, not shown, extends from the compartment 213 outward of the vacuum system.

The modified valve body 2" permits a higher contact pressure between the edge portion 9" and the inner wall of the vacuum line at equal gas pressure and equal overall dimensions of the valve body than in the embodiment of FIG. 3.

FIG. 5 illustrates a further modification of the valve arrangement shown in FIG. 3 which can maintain a tight seal even if the pressure system supplying gas to the cavity 13''' and chamber 113" on opposite sides of a normally spherically curved wall 8''' should break down. Nipples 7''', 107' connect the cavity 13''' and the chamber 113" to pressure and vacuum lines. The chamber 113" is provided with an abutment 14.

If the pressure differential between the cvity 13' and the chamber 113 in the valve body 2' (FIG. 3) exceeds a critical value, the wall 8' passes through a state in which it is practically flat and the diameter of the edge portion 9' reaches a maximum. Further displacement of the wall 8' outward of the cavity 13' causes the top face of the wall in the cavity to become concave while the top of the chamber 113 is bounded by a convex face of the wall 8'. The edge portion 9' is retracted from the inner wall of the line 1, and a seal previously formed is opened. The valve arrangement shown in FIG. 5 permits a different mode of operation.

Before the valve body 2''' is lowered into its position of preliminary engagement of the edge portion 9''' with the inner wall of the line portion 1, the gas pressure in the chamber 113" is raised above that in the cavity 13''' so that the edge portion 9''' is contracted to a diameter smaller than that assumed in the fully relaxed condition of the wall 8'''. The valve body 2''' thereafter is seated in a conforming part of the slightly conical line portion 1, and the pressure in the cavity 13''' is raised so much above that in the chamber 113" that the curvature of the wall 8''' is reversed and a convex face 15 of the wall, shown in broken line, engages the abutment 14. The curvature of the face 15 has a larger radius of curvature than the wall 8''' had in the non-illustrated contracted condition in which its edge portion 9''' first engaged the inner wall of the line 1. Since the axial position of the edge portion 9''' does not change during the reversal, a vacuum-tight seal is established across the line portion 1 and is not affected if the pressure in the gas supply breaks down. The valve body 2''' can only be released by gas pressure in the chamber 113" sufficient to flex the wall 8''' from the position shown in broken lines inward of the cavity 13''' beyond the intermediate position shown in fully drawn lines.

Valve bodies combining a flat, circular top wall, a cylindrical axial wall, and a spherically arcuate bottom wall are shown in FIGS. 1 to 5, but numerous other shapes are equally effective, although perhaps requiring different operating pressures and more costly to build, and such variations of the valve body 2 are illustrated in FIGS. 6 to 8. Corresponding variations of the other valve bodies 2', 2", 2''' will readily suggest themselves.

The cavity of the valve body $2^{IV}$ seen in FIG. 6 is contained between the convex face of a spherically arcuate bottom wall $8^{IV}$, and the concave face of a spherical segment of smaller radius of curvature. In the valve body $2^V$ of FIG. 7, a spherically arcuate bottom wall $8^V$ is joined, as by welding, to a cavity wall which is a segment of an ellipsoid of rotation generated by rotating an ellipse about its shorter axis which coincides with the axis of the valve arrangement. The valve body $2^{VI}$ seen in FIG. 8 combines a flat circular top wall and a cylindrical axial wall not significantly different from the walls 6, 5, with a bottom wall 8″ whose peripheral part tapers conically inward of the cavity in the valve body and envelops a central part which is flat, circular, and perpendicular to the valve axis.

An actual embodiment of the valve arrangement also shown in FIG. 3 is illustrated in greater detail in FIGS. 9 and 10. Only the sealing portion 1 of the vacuum line 11 is seen. As shown, it consists of several connected, annular elements for convenient assembly with the valve body 2' and the mechanism for moving the valve body into and out of the chamber 10. The edge portion 9' of the bottom wall 8' sealingly engages the inner wall of the line portion 1.

The valve body 2' is suspneded from one end of a tubular arm 20 by means of screws. Two hoses 21, 22 pass from a connector assembly 23 through the bore of the arm 20 and a seal 24 at the other end of the arm to non-illustrated valves and lines supplying compressed nitrogen or vacuum for the cavity 13' and the chamber 113, not themselves illustrated in FIGS. 9 and 10. The other end of the arm 20 is pivotally mounted on a frame 24 by means of a U-shaped bracket 25 and pins 26. The cylinder 27 of a pneumatic jack is fastened to frame 24 by a hinge pin 28 whereas the piston rod of the jack is attached to the bracket 25 by a pivot 29. The frame 24 is slidably mounted on a base plate 30 between upright guide rails 31, 32 and may be moved to shift the valve body 2' into and out of radial alignment with the chamber 10 by another jack 33 as indicated by double arrow 34. When the valve body 2' is raised from the position shown in FIG. 9, the arm 20 may be pivoted clockwise, as viewed in FIG. 10, to retract the valve body 2' into the chamber 10.

The base plate 30 is a part of the vacuum line and is sealed to a metal bellows 35 receiving a portion of the arm 20. The end of the arm sealed from the interior of the line portion 1, the jacks 27, 33 and associated elements are enclosed in a housing 36 indicated by a chain-dotted line and normally evacuated in a conventional manner, not shown.

The annular edge portions which provide sealing lips on the several valve bodies described and illustrated are integral portions of normally spherically or conically curved bottom walls, and such an arrangement is preferred because it transmits only minimal stress to other wall portions of the valve bodies. However, the edge portion may be a separate unitary member welded to an axially extending wall of the valve body near the circumference of the associated bottom wall.

A unitary axial wall of a valve body is usually built conveniently, but considerations of easy assembly may make it preferable to make the axial wall of several connected wall portions. Other minor variations will readily suggest themselves as specific conditions may require.

It should be understood, therefore, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. In a valve arrangement for sealing a vacuum line communicating with a vacuum system, the arrangement comprising a metallic valve body including an edge portion elongated in a closed loop, seating means in said vacuum line conformingly engageable with said edge portion over the entire length of said loop, moving means for moving said valve body toward and away from a position of engagement of said edge portion with said seating means, and pressure means for pressing the engaged edge portion toward said seating means with a pressure sufficient to form a vacuum-tight seal therebetween, the improvement in said valve body and in said pressure means which comprises:

(a) said valve body including a plurality of wall portions jointly sealing a cavity in said valve body, a first one of said wall portions having a peripheral part including said edge portion and a central part enveloped by said peripheral part, said peripheral part being joined to at least one other wall portion along said closed loop, said first wall portion sloping inward of said cavity from each longitudinal section of said loop toward said central part; and (b) supply means for supplying to said cavity a gas under a pressure sufficient to move said central part in a direction outward of said cavity and thereby to expand said peripheral part and the edge portion joined to said peripheral part for making said engagement with said seating means vacuum-tight.

2. In an arrangement as set forth in claim 1, an integral portion of said peripheral part projecting beyond said at least one other wall portion away from said central part, the projecting portion of said peripheral part constituting said edge portion.

3. In an arrangement as set forth in claim 1, said first wall portion being exposed in said vacuum line in said position of engagement.

4. In an arrangement as set forth in claim 1, said valve body being formed with a sealed chamber therein, said central part having two opposite faces respectively bounding said cavity and said chamber.

5. In an arrangement as set forth in claim 4, an abutment in said chamber limiting movement of said central part out of said cavity and into said chamber.

6. In an arrangement as set forth in claim 4, a second wall portion dividing said chamber into two compartments respectively adjacent to and remote from said cavity, said second wall portion having a peripheral part and a central part enveloped by the peripheral part of said second wall portion, the peripheral part of said second wall portion being joined to said at least one other wall portion along said closed loop, said second wall portion sloping inward of said remote compartment from each longitudinal section of said loop toward said central part of said second wall portion, and means for controlling gas pressure in at least one of said compartments.

7. In an arrangement as set forth in claim 1, said at least one other wall portion having a cylindrical surface in said cavity.

8. In an arrangement as set forth in claim 1, said first wall portions consisting of sheet metal, said loop defining a circle in a plane, and the largest dimension of said cavity perpendicular to said plane being smaller than the diameter of said circle.

9. In an arrangement as set forth in claim 1, the improvement in said seating means which comprises a substantially cylindrical wall, said cylindrical wall and said loop having a common axis, and said cylindrical wall projecting beyond said edge portion in both axial directions, said edge portion engaging said cylindrical wall along said loop in said position of engagement.

10. In a valve arrangement for sealing a vacuum line communicating with a vacuum system, the arrangement comprising a metallic valve body including an edge portion elongted in a closed loop, seating means in said vacuum line conformingly engageable with said edge portion over the entire length of said loop, moving means for moving said valve body toward and away from a position of engagement of said edge portion with said seating means, and pressure means for pressing the engaged edge portion toward sead seating means with a pressure sufficient to form a vacuum-tight seal therebetween, the improvement in said valve body and in said pressure means which comprises:

(a) said valve body including a plurality of wall portions jointly sealing a cavity in said valve body, a first one of said wall portions having a peripheral part including said edge portion and a central part enveloped by said peripheral part, said central part having respective faces in said cavity and outside said cavity, said peripheral part being joined to at least one other wall portion along said closed loop, said first wall portion sloping inward of said cavity from each longitudinal section of said loop toward said central part at predetermined respective gas pressures acting on said faces; and (b) supply means for supplying to one of said faces a gas under a pressure sufficient to move said central part in a direction transverse to said faces relative to said peripheral part.

11. In an arrangement as set forth in claim 10, said one face being said outer face.

* * * * *